United States Patent Office 3,646,125
Patented Feb. 29, 1972

3,646,125
TEREPHTHALIC ACID PURIFICATION PROCESS
Jean Berthoux, Decines, and Bernard Ginet, Lyon, France, assignors to Progil, Paris, France
No Drawing. Filed Feb. 10, 1969, Ser. No. 798,129
Claims priority, application France, Feb. 26, 1968, 141,514
Int. Cl. C07c 51/42
U.S. Cl. 260—525          5 Claims

ABSTRACT OF THE DISCLOSURE

Terephthalic acid is purified by heating in a solvent which is a mixture of acetic acid, water and acetophenone and then recrystallizing. This treatment may be followed by further heating the purified acid in a saturated aliphatic monocarboxylic acid containing 2–5 carbon atoms and recrystallization.

---

The present invention relates to a process of purification of terephthalic acid by recrystallization from a solvent and more particularly to novel mixtures of solvents usable in such a process.

The known methods of manufacturing terephthalic acid do not generally result in the direct production of a very pure product. When it is manufactured, for example, by catalytic oxidation of para-xylene in the liquid phase, the formed acid contains, in addition to some by products and colored residues of various origins, products of p-xylene partial oxidation, and especially 4-carboxy-benzaldehyde, named also terephthalaldehyde acid. Those impurities and especially the latter one, are a great nuuisance in certain further uses of the acid.

It is well known that terephthalic acid is an important raw material for synthetic textile fiber fabrication. When this acid is used, for example, in glycol esterification for the production of polyesters by polycondensation, the impurities it may contain are quite prejudicial to the quality of the product obtained. 4-carboxy-benzaldehyde especially has a very injurious action. The reactions it gives rise to, during polycondensation, contribute to give a dark color to the polyesters, to lower their melting point, and to decrease their mechanical resistance. Moreover, the other impurities which may be present in the acid, especially the colored products, are also prejudicial. This is why the terephthalic acid used in the textile field must be colorless and have great purity.

There are numerous terephthalic acid purification processes. Among the known methods are sublimation, treatment by means of adsorbing or sequestering agents, intermediary formation of salts or esters, impurities reduction and/or oxidation, and recrystallization. For the latter process, numerous solvents have already been recommended, such as aliphatic acids and some classes of ketones. British Pat. 785,051 dated Jan. 19, 1955, has described a process using a saturated aliphatic acid containing less than 7 carbon atoms, especially the acetic, propionic, butyric acids, for dissolving raw terephthalic acid. U.S. Pat. 2,952,704, dated Nov. 14, 1957, has proposed the use of liquid ketones containing up to 6 carbon atoms in their molecule. German Pat. 1,126,855, dated Sept. 10, 1960, has claimed the use of ketonic derivatives of cyclo-octane, bicyclooctane and bicyclooctene. French Pat. 1,451,797, dated Oct. 27, 1965, has described a terephthalic acid purification process by recrystallization, wherein the raw matrial is dissolved in an aliphatic—or cycloaliphatic—ketone, which contains 3 to 8 carbon atoms in its molecule.

The different known purification methods give, of course, fairly good results. But they present certain disadvantages. Most of these processes are complex and expensive. Thus, for example, recrystallization methods, one of the most used, require the use either of expensive solvents such as lactones, amides, etc., or of a great number of operative stages when common solvents, such as acetic acid are used, in order to obtain a terephthalic acid having a sufficient degree of purity and especially meeting the standards required by the textile industry.

There has now been discovered an improved process for terephthalic acid purification by recrystallization, which yields an acid of great purity under commercially interesting conditions.

According to the present invention, the process utilizes as a solvent for the raw terephthalic acid for a purification through recrystallization, ternary mixtures consisting of acetic acid, water and acetophenone which may be possibly substituted by an alkyl radical on the phenyl ring.

According to the present invention, the process of terephthalic acid purification comprises submitting the raw acid to a thermal treatment in a mixture of solvents consisting of acetic acid, acetophenone, possibly substituted, and water, under the proper pressure of the system or under a higher pressure, and then recrystallizing by cooling the treated acid and separating it by any known means.

The ternary mixture of solvents (called hereinafter the "solvent") usable in terephthalic acid recrystallization is a fundamental part of the invention. As the ketonic compound it is possible to use non-substituted acetophenone, or acetophenone having a lower alkyl radical, such as methyl, ethyl, or isopropyl in orthometa or para position on the phenyl ring. As a simplification in the following description, the term acetophenone will be used and is meant to include also the substituted compounds as described above.

Generally the respective ratios of the 3 constituents of the mixture to make up 100 parts of solvent, may be between 0.5 and 50 parts of acetophenone, 0.005 and 25 parts of water, and 99.495 and 25 parts of acetic acid (the parts being calculated by weight). However, it is preferred to use quantities ranging between 2 and 20 parts of acetophenone, 0.1 and 3 parts of water and 97.9 and 77 parts of acetic acid.

In the process of terephthalic acid purification according to the present invention, the operative conditions may vary greatly. In a general way, the temperature and pressure are chosen so as to produce a sufficient dissolution of terephthalic acid in the solvent and to maintain a major fraction of the mass in the liquid phase. Given those conditions, it is possible to operate at temperatures of between 150 and 350° C. and in applying initial pressures, for example, up to 10 bars. However, the preferred temperature range is between 200 and 280° C. and an operation under autogenous pressure does not change the results greatly.

The quantity of solvent to be used with respect to the quantity of acid to be treated is not an especially critical factor and may be chosen in a large range. It may correspond to a ponderal ratio of terephthalic acid/solvent ranging between 1/2 and 1/40. However, it is preferred to use ratios of between 1/5 and 1/15. An especially favorable process consists in using a ratio 1/10, with a solvent containing the preferred quantities of constituents mentioned above and, more specifically, 9 to 12 parts of acetophenone, 1 to 2 parts of water and 90 to 86 parts of acetic acid, per 100 parts of solvent.

It is advantageous to conduct the thermal treatment under an atmosphere of inert gas, such as nitrogen, and to operate with stirring. Contact time between the product to be treated and the solvent has no notable influence on the results; however, it is believed that a time of 15 minutes is a minimum; further, the lengthening of the treatment to several hours does not improve purification. Contact times preferably range between 30 minutes and 2 hours.

At the end of the thermal treatment, the mixture is cooled, in order to allow terephthalic acid recrystallization. Then the acid is isolated by known means such as filtration or centrifugation. It is possible, for example, to cool to room temperature (about 25° C.) under the proper pressure. However, according to an especially advantageous mode of operation, the mass is partially cooled, under autogenous pressure, down to a temperature which, with regard to the one taken during thermal treatment, may be, for example, between 100 and 180° C. Then the terephthalic acid is isolated from the mixture of filtration, at the temperature obtained in this way and under the corresponding pressure. Separating the acid under such conditions leads to a purification which is much higher than is obtained using a filtration at room temperature, especially when the starting raw acid is very impure.

The filtration cake may be washed with any solvent such as water, acetic acid or the specific solvent of the invention.

According to a variation, the purification process according to the invention may utilize a complementary stage of terephthalic acid recrystallization from a saturated aliphatic monocarboxylic acid. For this purpose and acid containing 2 to 5 carbon atoms in the molecule and preferably acetic acid may be used. This operation completes the action of the previous treatment and also results in the removal of acetophenone traces.

The recrystallization from acetic acid is conducted under operative conditions similar to the ones utilized with the three constituents-solvent described above. First, the product to be treated and solvent are mixed using, for example, a ponderal ratio terephthalic acid/aliphatic acid of between 1/2 and 1/40, preferably 1/10 to 1/20. The mixture is heated to a temperature of between 200 and 300° C., preferably 225 and 275° C. for a period of time which is generally in the range of 30 minutes to 2 hours, under autogenous pressure. It is advantageously operated under nitrogen atmosphere. After cooling, terephthalic acid is isolated under conditions which may be the same as the ones used for the first treatment.

The solvent mixture and the aliphatic acid, if desired, used according to the invention may be distilled and reused in further operations.

The novel purification method which has just been described may be applied to any raw terephthalic acid. It is especially useful to purify an acid obtained by para-xylene oxidation by means of air or oxygen in liquid phase in the presence of heavy metals as catalysts. Moreover, this method may be applied equally well to a very impure raw product as to an acid containing only a relatively small proportion of impurities. Indeed, this process results in both cases to a fairly identical purity. The process according to the invention permits the extraction from the raw acid of all of the impurities and to remove the colored residues from various origins, which leads to the obtaining of a terephthalic acid having a great purity. It should also be noted that the purification process according to the present invention is very valuable since it results in an insignificant loss in terephthalic acid and a very small loss in solvents, generally lower than 1%.

The examples hereinafter, given in a non-limitative way, show how the invention may be put into practice. The parts are parts by weight. The optical density indicated in these examples has been measured with the use of a cell 10 cm. long, to the wavelength of 380 m$\mu$, on a solution of 1 g. of terephthalic acid in 49 g. of a mixture of 50/50 by weight or water and ammonia at 25° Bé.

EXAMPLE 1

There was loaded into an autoclave provided with a stirring system, 500 parts of a mixture of solvents containing 54 parts of acetophenone, 8 parts of water and 438 parts of acetic acid, and 50 parts of a raw terephthalic acid (99.77%) containing 2200 p.p.m. (parts per million) of 4-carboxy benzaldehyde and having an optical density measured as defined hereinabove, of 0.115.

After having purged the air by nitrogen sweeping, the mixture was brought to 250° C. with stirring and maintained at this temperature for 1 hour, with continued stirring. Then the reaction mass was cooled to 25° C. and submitted to filtration.

The crystallized recovered terephthalic acid contained only 40 p.p.m. of 4-carboxy-benzaldehyde and had an optical density of 0.040.

After distillation the filtrate was reused in a further operation.

The terephthalic acid obtained in this example was loaded again into the autoclave, with 750 parts of acetic acid. After sweeping with nitrogen, the mixture was treated for 1 hour at 250° C. with stirring. After mass cooling at 25° C. it was filtered.

49.7 parts of terephthalic acid were recovered, containing 5 p.p.m. of 4-carboxy-benzaldehyde and had an optical density of 0.020.

The same treatment as the one indicated above was conducted starting with 50 parts of terephthalic acid having the same characteristics and 500 parts of acetic acid, instead of the mixture acetophenone/water/acetic acid. After this operation the terephthalic acid contained 300 p.p.m. of 4-carboxy-benzaldehyde. Two successive operations of the same type must be achieved in order to lower this content to 10 p.p.m.

EXAMPLE 2

The operations of the previous example were exactly reproduced for treating a raw terephthalic acid having 3500 p.p.m. of 4-carboxy-benzaldehyde, having an optical density of 0.185.

After the recrystallization stage from the mixture acetophenone/water/acetic acid, the purified acid contained 50 p.p.m. of 4-carboxy-benzaldehyde and after the acetic acid treatment it titrated 5 p.p.m. of 4-carboxy-benzaldehyde and presented an optical density of 0.025.

EXAMPLE 3

A mixture of 50 parts of terephthalic acid having the same characteristics as in Example 1 and of 500 parts of a solvent constituted of 41 parts of acetophenone, 3 parts of water and 456 parts of acetic acid were maintained in an autoclave at 250° C. with stirring for 1 hour after air purge with nitrogen.

After cooling of the reaction mass to 25° C., and filtration, 49.8 parts of terephthalic acid were obtained, containing 60 p.p.m. of 4-carboxy-benzaldehyde and having an optical density of 0.065.

The thermal treatment under the same conditions was repeated with cooling to only 130° C., and it was immediately filtered under the corresponding pressure. The terephthalic acid obtained in this way contained 51 p.p.m. of 4-carboxybenzaldehyde and had an optical density of 0.025.

EXAMPLE 4

Under the same conditions starting with a raw terephthalic acid having the same characteristics as in the previous example, 50 parts of acid were purified using 500 parts of a solvent containing 75 parts of acetophenone, 4 parts of water and 421 parts of acetic acid.

After cooling the mixture to 25° C. and filtration, there was obtained a terephthalic acid having 70 p.p.m. of 4-carboxybenzaldehyde, with an optical density of 0.020.

EXAMPLE 5

50 parts of terephthalic acid of the same type as in the previous examples were treated in an autoclave with stirring at 250° C. for 1 hour with 500 parts of solvent containing 25 parts of acetophenone, 3 parts of water and 472 parts of acetic acid.

After cooling to 25° C. and filtration there was obtained a terephthalic acid with 85 p.p.m. of 4-carboxy-benzaldehyde and having an optical density of 0.045.

EXAMPLE 6

50 parts of terephthalic acid having 2200 p.p.m. of 4-carboxy-benzaldehyde were treated at 250° C. for 1 hour with 250 parts of solvent composed of 10.25 parts of acetophenone, 1.5 parts of water and 238.25 parts of acetic acid.

The recovered terephthalic acid contained 100 p.p.m. of 4-carboxy-benzaldehyde and presented an optical density of 0.090.

This acid was loaded again into an autoclave with 1500 parts of acetic acid. After purging with nitrogen the mixture was maintained at 250° C. for 1 hour. After cooling at 25° C. and filtration, there was obtained 49.6 parts of terephthalic acid having 13 p.p.m. of 4-carboxy-benzaldehyde and with an optical density of 0.020.

EXAMPLE 7

50 parts of terephthalic acid having 2000 p.p.m. of 4-carboxy-benzaldehyde were treated for 1 hour with 500 parts of solvent composed of 55 parts of 4-methyl-acetophenone, 8 parts of water and 437 parts of acetic acid.

After treatment of the recovered terephthalic acid with 750 parts of acetic acid under the same conditions as in Example 6, there was obtained a pure acid containing only 15 p.p.m. of 4-carboxy-benzaldehyde and having an optical density of 0.020.

What is claimed is:

1. A process of purifying terephthalic acid containing colored residues and terephthalaldehyde acid which comprises (a) submitting said acid to a treatment at temperatures between 150 and 350° C. in a mixture of solvents consisting of (1) a ketone selected from the group consisting of acetophenone and acetophenone having a lower alkyl radical selected from the group of methyl, ethyl and isopropyl, substituted in the phenyl ring, (2) water and (3) acetic acid, using a weight ratio of terephthalic acid/solvents ranging between 1/2 to 1/40 and quantities ranging between 2 and 20 parts of said acetophenone, 0.1 and 3 parts of water and 97.9 and 77 parts of acetic acid, the parts being calculated by weight per 100 parts of solvents, (b) then recrystallizing the treated acid by cooling and (c) separating the recrystallized acid from said solvent mixture containing said colored residues and terephthalaldehydic acid.

2. A process according to claim 1 wherein the weight ratio of terephthalic acid to solvent mixture is between 1/5 and 1/15.

3. A process according to claim 1 wherein the acid-solvent mass is maintained at a temperature from 150 to 350° C. for a period of 30 minutes to 2 hours.

4. A process according to claim 1 wherein the acid-solvent mass is maintained at a temperature of 200 to 280° C. for a period of 30 minutes to 2 hours.

5. A process according to claim 1 wherein the recrystallized terephthaic acid is subjected to a further recrystallization step using a saturated aliphatic monocarboxylic acid containing 2 to 5 carbon atoms as solvent.

References Cited

UNITED STATES PATENTS

| 2,857,429 | 10/1958 | Bruson et al. | 260—525 |
| 3,364,256 | 1/1968 | Ichikawa et al. | 260—525 |

FOREIGN PATENTS

| 978,536 | 12/1964 | Great Britain | 260—525 |

LORRAINE A. WEINBERGER, Primary Examiner

R. S. WEISSBERG, Assistant Examiner